United States Patent Office 3,347,634
Patented Oct. 17, 1967

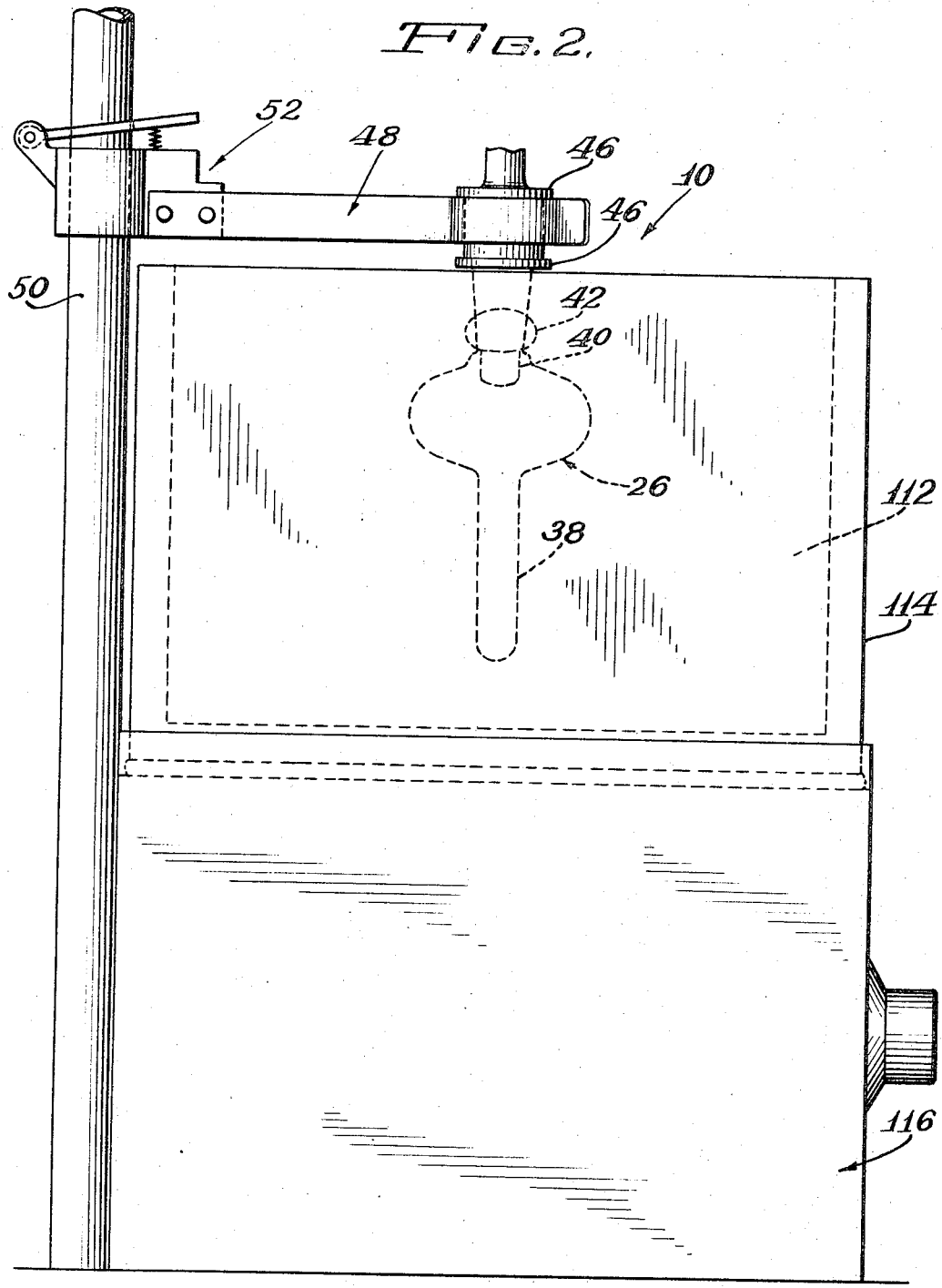

3,347,634
METHOD AND APPARATUS FOR DETERMINATION OF ABSORPTION OF A GAS BY A LIQUID
Charles A. Brown, 2537 Benvenue Ave., Apt. 306,
Berkeley, Calif. 94704
Filed July 20, 1964, Ser. No. 383,705
10 Claims. (Cl. 23—230)

ABSTRACT OF THE DISCLOSURE

A method and apparatus for determining the amount of hydrogen gas absorbed by an unhydrogenated liquid. The apparatus consists of three vessels, a hydrogen generator, a reaction vessel, and a mercury bubbler, which are connected in series. The bubbler acts as a safety vent and a leveling device to standardize pressures within the apparatus. A water burette is attached to the generator with a passageway from the burette through a mercury filled well in the bottom of the generator. The method consists of providing hydrogen gas in the closed system and then placing a hydrogen absorbing liquid sample in the reaction vessel. After absorption of the gas by the unhydrogenated liquid is complete, water is forced into the system from the burette through the mercury in the generator in a volumetric measured amount equivalent to the amount of absorbed gas.

---

This invention relates to an improved method and apparatus for determining the amount of gas which is absorbed by a liquid substance, and it particularly relates to a method and apparatus for determining the amount of absorption of hydrogen gas by a chemically unsaturated substance, such as a substance containing unsaturated aliphatic chains, aromatic rings, or reactive functional groups reducible by hydrogenation.

In the analysis of chemical substances, it is often desirable to determine the amount of gas which may be absorbed by a liquid substance, such as the amount of hydrogen which would be absorbed by a chemically unsaturated substance. Such analysis is often required in gasoline production and control, in the production of edible fats and oils to determine the degree of chemical unsaturation thereof, and in the pharmaceutical and petrochemical industries for determining the degree of chemical unsaturation of a particular substance. Heretofore, the amount of unsaturated acids present in a substance has been indicated by its iodine number, which although commonly used, does not provide highly accurate information as to the chemical unsaturation.

In order to provide a higher degree of accuracy than is possible with the iodine number, various methods and devices have been provided for measuring the amount of hydrogen absorbed by a liquid. Generally, known available apparatus is complex in construction and operation and does not provide the high degree of accuracy which is desired or required in analyzing various substances. For example, in previous hydrogenation methods and apparatus, thermostatic burettes have been required for measuring the amount of hydrogen absorbed by the substance being analyzed. Also, other methods and apparatus require the use of ancillary equipment such as air conditioned enclosures; such equipment is not only expensive, but the apparatus does not lend itself to portability.

It is therefore an important object of this invention to provide an improved method and apparatus for determining the amount of gas which may be absorbed by a liquid substance, such as for determining the amount of hydrogen absorbed by a chemically unsaturated substance.

It is also an object of this invention to provide an improved method and apparatus for directly determining the amount of absorption of a gas by a liquid by replacing the absorbed gas with a liquid, such as water, the volume of which is readily determined.

It is a further object of this invention to provide improved apparatus for determining the amount of gas such as hydrogen, absorbed by a liquid, such as a chemically unsaturated substance, wherein the apparatus is characterized by its simplicity and economy of construction and operation.

It is another object of this invention to provide a highly simplified method for determining the amount of hydrogen absorbed by an unknown chemically unsaturated substance contained in a closed system, wherein after absorption of the gas, by restoring the initial pressure of the system by replacing the absorbed gas with a measured volume of water, the volume of gas absorbed is directly determined.

Further purposes and objects of this invention will appear as the specification proceeds.

In describing my improved method and apparatus for determining the degree of absorption of a gas by a liquid substance contained in a closed system, it is to be understood that the method may be used in connection with various gases and liquids, but for the purpose of simplicity, the description herein will relate only to the amount of hydrogen to be absorbed by a chemically unsaturated substance in a hydrogenation procedure. By the term "liquid substance," I include pure liquids and a liquid or solid in solution in a suitable solvent.

In my improved hydrogenating method, a suitable hydrogenation catalyst is initially introduced into a vessel or container which may be incorporated within a closed system. Hydrogen gas is then passed through the system in order to purge all foreign gases therefrom and fill the space of the system with hydrogen gas. The hydrogen may be generated either in the hydrogenation apparatus itself or it may be introduced to the system from an external source. It is preferred that the hydrogen be generated in the apparatus itself, since then no external source of hydrogen is required. After purging the system and filling it with the hydrogen, the pressure in the closed system, as exerted by the hydrogen, is determined by any suitable procedure, such as by use of a manometer or other pressure apparatus. A particularly useful pressure determining apparatus will be described hereinafter in greater detail.

Having knowledge of the initial pressure of the closed system, an unknown chemically unsaturated substance is then introduced to the vessel containing the hydrogenation catalyst. The entire apparatus is brought to and is maintained at the desired temperature, as at about 25° C., by immersing the hydrogenation apparatus in a constant temperature bath. The unsaturated substance is mixed with the hydrogenation catalyst and hydrogenation occurs. As the hydrogen in the system is absorbed by the unsaturated substance, the pressure of the system decreases until the unsaturated substance has been completely saturated so that substantially all double and triple bonds have been eliminated.

After hydrogenation ceases, a determination of the amount of hydrogen absorbed by the unsaturated substance is made. This is accomplished by adding a displacing liquid into the closed system in order to replace the volume of hydrogen which was absorbed by the previously unsaturated substance during the hydrogenation process. The displacing liquid is added to the system until the pressure determination means indicates that the pressure of the system has been restored to the starting level, that is, to the pressure in the system before any hydrogenation had occurred. The amount of displacing liquid added to the system to replace the hydrogen is then determined. This determination is readily made since the water may be added to the system from a graduated burette and readings may be made before and after the addition of the displacing liquid. The volume of displacing liquid added to the system is equivalent to the volume of hydrogen used up, thereby providing a highly accurate determination of the amount of unsaturation of the unknown substance.

Further samples of chemically unsaturated substances may be added to the vessel in the closed system, mixed with the catalyst, and hydrogenated until all of the hydrogen in the apparatus is used up. This is indicated when the entire system is filled with the displacing liquid, which is preferably water. In adding the further samples of unsaturated substances to the closed system, the addition is made without opening the closed system since this would destroy the accuracy of the analyses. This may be accomplished in various ways, such as by adding the chemical substance through a rubber stopper with a hypodermic needle.

A particular embodiment of the improved apparatus useful for the practice of my method is shown in the accompanying drawings wherein:

FIGURE 2 is an end elevational view of the apparatus of FIGURE 1 in place on constant temperature apparatus.

Figure 1:
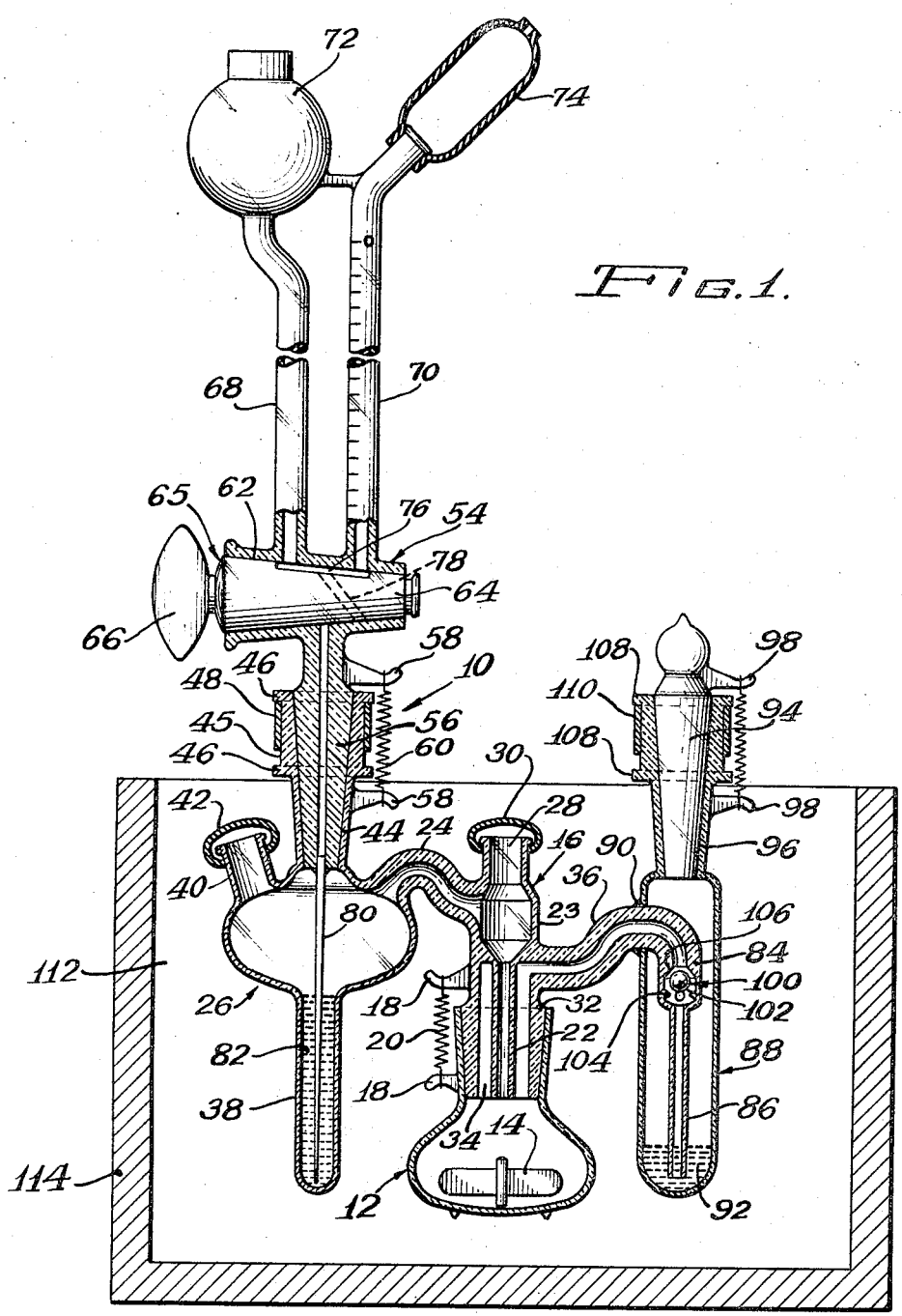
FIGURE 1 is a front elevational view of the apparatus.

Referring particularly to FIGURE 1, the apparatus 10 useful for determining the degree of absorption of hydrogen by a chemically unsaturated substance is provided with a reaction flask 12 wherein the hydrogenation occurs. The flask 12 contains a suitable hydrogenation catalyst, as well as the unsaturated substance which is to be hydrogenated. A magnetic stirrer 14 is also positioned in the bottom of the flask 12 for intimately mixing the catalyst with the unsaturated substance in the presence of hydrogen in order to facilitate the hydrogenation process.

A connection tube 16 is inserted into the flask 12 and is sealably positioned therein. In order to effect the desired seal, a ground glass connection is provided between the inner conical surface of the upper portion of the flask 12 and the mating outer conical surface of the lower portion of the connection tube 16. In order to secure the connection of the tube 16 to the flask 12, hooked portions 18 extend outwardly from both the flask 12 and from the connection tube 16, and the opposite ends of a tension spring 20 are secured to the hooked portions 18 for biasing the connection tube 16 into sealing relationship with the flask 12.

The connection tube 16 includes an inner elongated tubular portion 22 which has an open lower end which communicates with the interior of the flask 12. The open upper end of the tubular portion 22 communicates with an upper chamber 23 and a side port 24, which extends to an integral generator portion 26. The upper chamber 23 of the connection tube 16 communicates with the open upper end 28 of the connection tube 16. A rubber stopper member 30 is securely positioned around the open end 28 in order to provide a seal therearound. The axial inner tubular portion 22 and the outer wall 32 of the connection tube 16 define an annular chamber 34 therebetween which has a side vent 36 at its upper end, which vent extends to the interior of a bubbler vessel 88.

The generator 26 is provided for effecting the generation of hydrogen gas within the apparatus 10. The generator 26 includes a lower, tubular well 38, and a side port 40, through which hydrogen forming chemicals may be added. The open upper end of the side port 40 has a rubber stopper 42 which seals the interior of the generator 26 from the atmosphere. The generator 26 includes a conical outlet portion 44, having a restricted bottom. The wall 45 of the outlet portion 44 is generally cylindrical and has upper and lower flanges 46. The outer surface of the wall 45 is adapted to fixedly receive a clamping member 48 thereon, between the flanges 46, as in FIGURE 2. The clamp body 48 is slidable on an upright support pole 50 and may be locked in the desired position by the locking means 52 on the clamp body 48.

The inner conical surface of the outlet portion 44 of the generator 26 sealably receives a burette 54 therein. The seal at the conical surface of the outlet 44 is maintained with the conical outer surface of the lower portion 56 of the burette 54 by a ground glass connection between the parts. The burette 54 is secured in sealing relationship with the generator 26 by means of a tension spring 60 which is received by the outwardly projecting hooked portions 58, one being integral with the lower portion 56 of the burette 54 and the other being integral with the wall 45 of the generator 26, whereby the spring 60 biases the parts together in the desired sealing relationship.

Directly above the thickened lower portion 56 of the burette 54, a lateral conical aperture 62 is provided for rotatably receiving a tapered plug member 64, which has an outer conical surface which sealably engages the inner conical surface of the aperture 62; the aperture 62 and plug member 64 thereby form a valve 65. The plug 64 includes a handle 66 for imparting rotation thereto. Two spaced, substantially parallel upright tubular legs 68 and 70 project upwardly from the valve portion 65 of the burette 54. The first leg 68 includes a generally spherical and open upper end 72, through which the displacing liquid, such as water, may be added. The other upstanding leg 70 has graduated markings thereon whereby the amount of displacing liquid added to the generator 26 is readily determined. The open upper end of the graduated leg 70 is provided with a resilient ball 74, which, upon squeezing, is adapted to impart air pressure to the column of water contained in the graduated leg 70 for adding the water to the system enclosed by the apparatus 10.

The rotatable member 64 of the valve 65 includes a recessed portion 76 therein, whereby communication may be provided between the open lower ends of the upright legs 68 and 70 of the burette 54. When water is added to the first leg 68, the water level also rises to the same level in the graduated leg 70 because of communication between the legs 68 and 70 at the recess portion 76. When the desired level is reached in the leg 70, the valve member 64 is rotated until the recess 76 no longer communicates with the lower ends of the legs 68 and 70, thereby providing a seal therebetween. The valve plug member 64 is provided with a diagonal conduit 78, which provides communication between the lower end of the graduated leg 70 and the central channel 79 at the lower end of the burette; the channel 79 communicates with a hollow needle 80, which is securely positioned centrally of the burette 54 and extends downwardly into the generator 26 and terminates with its open lower end a short distance above the bottom of the well 38 of the generator 26. The well 38 is filled with a heavy liquid substance, which is immiscible with the displacing liquid in the burette 54; mercury 82 is particularly satisfactory as the liquid in the well and it supports the displacing liquid in the burette leg 70 and in the hollow needle 80. The upper level of the mercury 82 is positioned above the outlet end of the hollow needle 80, whereby the elevation pressure of the mercury 82 normally prevents the passage of water from the burette 54 into the generator 26.

The side port 36 extends laterally from the flask 12 and terminates in a downturned terminal portion 84. The downturned portion 84 of the side port 36 communicates with an integral tubular portion 86 having an open lower end. A cylindrical bubbler chamber or enclosed container 88 is provided with a lateral aperture at its upper portion which is adapted to be secured at 90 to the outer periphery of the side port 36. The container 88 has a heavy liquid, as mercury 92, in its lower end, the upper level thereof being above the open lower end of the tubular portion 86. The container 88 has its open upper end enclosed by a closure member 94, which has its outer conical outer surface in sealing engagement with the mating conical inner surface of the open upper portion 96 of the container 88. The plug 94 is held in sealing securement with the container 88 by hooked portions 98, which are integral with both the plug 94 and the upper portion 96 of the container 88, and by a spring 100 which has its opposite ends secured to the hooks 98 for biasing the plug or closure member 94 into firm engagement with the container 88. The plug 94 contains a passageway (not shown) for permitting escape of gases from the container 88.

The downturned portion 84 includes a check valve portion 100 immediately above the tubular portion 86. The check valve portion 100 includes a ball check 102 and a plurality of inwardly projecting ball retaining members 104 holding the ball 102 between the downturned end of the side port 36, but above the upper opening of the tubular portion 86. The ball check 100 substantially prevents excessive pressure in the container 88 from forcing the mercury 92 through the side port 36. The ball 102 seats against the upper frusto-conical surface 106 to thereby prevent the passage of mercury into the side port 36 and then into the reaction flask 12.

The upper portion 96 of the container 88, formed in a manner similar to the upper portion of the generator 26, includes flanges 108, between which a clamp 110 may be securely positioned. In a manner similar to the clamp 48, the clamp 110 is slidably positioned on an upright pole (not shown) by means of movable locking means (not shown). The clamps 48 and 110 support the entire apparatus 10. The clamps 48 and 110 are adjusted so that the upper flanges of the generator 26 and the container 88 are in substantial alignment. Also, the entire apparatus 10 is suspended in a constant temperature bath. The apparatus 10 is immersed in a liquid 112, which is contained in the vessel 114. The vessel 114 is mounted upon base 116 which includes means for heating the liquid 112 and means for imparting rotation to the magnetic stirrer 14.

The operation of the apparatus 10 may be most clearly understood by providing a detailed description of a particular example.

To the flask 12, prior to connection to the connection tube 16, there is added .1 g. of carbon, 2 cc. of isopropyl alcohol, and 2 drops of 0.2 M chloroplatinic acid in isopropyl alcohol. The magnetic stirrer 14 is placed in the bottom the flask 12. 1 cc. of 0.1 M sodium borohydride in isopropyl alcohol is added with stirring, followed by 5 drops of concentrated acetic acid; this is done over a period of about 30 seconds to 1 minute to give the hydrogenation catalyst time to reduce. The connection tube 16 is then secured in sealing engagement with the flask 12, the securement being maintained by the hooks 18 and the spring 20.

The burette 54 is then placed in sealing engagement with the generator 26, the open lower end of the hollow needle 80 terminating above the bottom of the mercury well 38. The mercury required to fill the well 38 is added through the port 40 of the generator 26. ½ cc. of concentrated acetic acid and ½ cc. of water are added to the generator bowl 26 through the port 40. The stopper 42 is then secured around the port 40 to cause sealing thereof and the stopper 30 is also placed in sealing engagement with the open upper end of the connection tube 16.

A hypodermic needle is then passed through the stopper 42 for adding 1 cc. of a 2.0 M sodium borohydride solution in 1.0 M base sodium hydroxide to the generator bowl 26. These chemicals react with the chemicals already in the generator bowl in order to produce hydrogen gas. The hydrogen generated passes through the port 24, downwardly through the tubular portion 22 of the connection tube 16, and then into the flask 12; the hydrogen then passes upwardly through the annular space formed between the tubular portion 22 and the wall 32 of the connection tube 16, outwardly through the side vent 36 and the downturned portion 84, through the tube 86, and then upwardly through the mercury 92 in the container 88. The hydrogen finally passes to the atmosphere through the passageway provided in the plug 94. The passage of the hydrogen through the apparatus 10 causes purging of substantially all gases, other than hydrogen.

About 200 cc. of hydrogen is allow to pass through the apparatus 10, which effectively causes purging of the 30–40 cc. volume of the closed system. The plug or closure 94 is then secured in place on the container 88 in order to effect the desired seal. The desired level (which may be indicated by a mark) of the mercury 92 in the tube 86 indicates the initial or starting pressure in the system enclosed by the apparatus 10, since the hydrogen gas exerts pressure against the mercury 92 from opposite sides. The apparatus 10 is then totally immersed in the constant temperature bath 112.

The burette 54 is filled with water through the open upper end 72 of the first leg 68, the water passing through the recess 76 in the valve member 64 and upwardly into the graduated leg 70 of the burette 54. When the level of water is at the desired level in the leg 70, the filling is stopped and the rotatable valve 64 is turned to the closed position. The entire apparatus is allowed to equilibrate in the bath by immersion for about 5 minutes and is maintained in the common temperature bath during the entire operation hereinafter.

An unsaturated substance, such as octene, is then injected through the stopper 30 and into the flask 12. In this example, .05 cc. of 0.5 M 1-octene in isopropyl alcohol was injected into the flask. The magnetic stirring is then begun and the valve 64 of the burette 54 is opened to provide communication between the leg 70 and the hollow needle 80. When the hydrogenation reaction ceases, which can be determined when there is no longer any lowering of the water in the burette, the system is then allowed to equilibrate for one minute in the bath.

During the hydrogenation, hydrogen in the enclosed system is being added to the octene and the pressure in the system decreases. This decrease in pressure on the flask side of the mercury 92, causes the level of mercury to rise within the tubular portion 86, since the pressure on the container side of the mercury 92 is greater. At the termination of hydrogenation, pressure is applied to the water in the leg 70 of the burette 54 in order to force water into the system, by means of the ball 74, through the hollow needle 80, upwardly through the mercury within the well 38, and into the generator 26. Since a known substance is initially used for hydrogenation, the apparatus is then calibrated and it is ready to receive an unknown sample of a chemically unsaturated liquid which may also be injected through the stopper 30. The hydrogenating of the unknown substance then occurs in the same manner. The water is forced into the generator 26 by operation of the resilient ball 74 in order to move the mercury level down to the original level in the tubular portion 86, thereby restoring the initial pressure of the system. The volume amount of water added to the system, as determined by the difference in burette readings before and after water is forced into the system, is known and this is equal to the volume amount of hydrogen used up during hydrogenation, thereby giving the desired results.

While in the foregoing, there has been provided a detailed description of one example illustrating my improved method as well as a detailed description of a particular embodiment of apparatus useful in the practice of my process, it is to be understood that all equivalents obvious to those having skill in the art are to be included within the scope of the invention as claimed.

What I claim and desire to secure by Letters Patent is:

1. Apparatus for determining the amount of gas absorbed by a liquid substance in a closed system, said apparatus comprising means for receiving said liquid substance, means in communication with said receiving means for permitting the generating and the filling of said system with said gas, liquid sealing means positioned in the lower portion of said permitting means, means for introducing a displacing liquid, through said sealing means, into said permitting means, means containing a pressure determining liquid, and sole means connecting said receiving means with said containing means and having an upright portion with an outlet positioned below the upper level of said pressure determining liquid, whereby as said gas is absorbed by said liquid substance, the pressure of said system decreases and the pressure determining liquid moves upwardly in the upright portion of said connecting means, and as said displacing liquid is introduced into said system, the pressure of said system increases to its original level and the pressure determining liquid moves downwardy until it reaches its original level.

2. Apparatus for determining the amount of gas absorbed by a liquid substance in a closed system, said apparatus comprising a flask for receiving said liquid substance, a vessel communicating with said flask for generating and filling said system with said gas, a well in the lower portion of said vessel for receiving a liquid medium, means for introducing a displacing liquid through said medium to said vessel, a container having a pressure determining liquid therein, and sole conduit means connecting said flask with an outlet positioned below the upper level of said pressure determining liquid, whereby as said gas is absorbed by said liquid substance, the pressure in said system decreases and the pressure determining liquid moves upwardly in said conduit means, and as said displacing liquid is introduced into said vessel, the pressure in said system increases to its original level and the pressure determining liquid is moved downwardly in the conduit means until it reaches its original level.

3. The apparatus of claim 2 including magnetic stirring means in said flask and a constant temperature bath means into which said apparatus is placed such that temperature equilibrium of said gas absorbing reaction is maintained.

4. Apparatus for determining the amount of gas absorbed by liquid substance in a closed system, said apparatus comprising a flask for receiving said substance, a vessel in communication with said flask for generating and filling said system with said gas, a well defined in the lower portion of said vessel for receiving a liquid medium, means for introducing a displacing liquid into said vessel through said medium, said displacing liquid having a density less than said liquid medium and being immiscible therewith, a container having a pressure determining liquid in the lower end thereof, sole means communicating with said flask with an outlet positioned below the upper level of said pressure determining liquid, and means for causing absorption of said gas by said liquid substance, whereby the pressure in said system decreases and the pressure determining liquid moves upwardly in said conduit means as gas absorption occurs, and as said displacing liquid is introduced to said vessel, the initial pressure in said space is restored and said pressure determining liquid is restored to its original level.

5. Apparatus for determining the amount of absorption of a gas by a liquid substance in a closed system, said apparatus comprising a reaction flask containing said liquid substance, a gas generating vessel in communication with said flask for introducing and filling said system with said gas, a well in the lower portion of said vessel for receiving a high density liquid, a burette mounted on said vessel and having a delivery tube extending below the upper level of said high density liquid, said burette being adapted to receive a displacing liquid therein whereby said displacing liquid may be introduced through said delivery tube and into said vessel, said displacing liquid and said high density liquid being of markedly different density and being immiscible with respect to each other, a substantially enclosed container having a pressure determining liquid in the lower end thereof, sole conduit means communicating with said flask and having an upright terminal portion positioned below the upper level of said pressure determining liquid, and means for forcing said displacing liquid into said closed system after absorption of said gas by said liquid substance whereby as the liquid level of said pressure determining liquid moves upwardly in said conduit means as a result of reduced pressure in said system, the introduction of said displacing liquid therein causes said pressure determining liquid to move downwardly to its original level.

6. Apparatus for determining the amount of hydrogen absorbed by a chemically unsaturated substance in a closed system, said apparatus comprising a reaction flask containing said substance and a hydrogenation catalyst in said flask, means for mixing said substance and said catalyst, a vessel containing hydrogen generating substances in communication with said flask whereby hydrogen is introduced to and fills said system, means for causing hydrogenation in said system, a well in the lower portion of said vessel for receiving mercury therein, a burette mounted on said vessel and having a delivery tube extending below the upper level of said mercury, said burette having a graduated leg to which water is added, whereby the amount of water added to said closed system may be determined, said water being passed through said delivery tube, through said mercury, and into said vessel, a closed container having mercury in the lower end thereof, a sole conduit extending from said flask to said container and having a downturned tubular end portion which is positioned below the upper level of the mercury in said closed container, and means on said graduated leg for forcing said water into said closed system after absorption of said hydrogen by said substance, whereby as the liquid level of the mercury in said container moves upwardly in said tubular end portion as a result of reduced pressure in said system, the introduction of water to said system causes the pressure in said system to increase to its level, thereby causing the mercury in said container to move downwardly to its original level.

7. A method for determining the amount of absorption of a gas by a liquid substance in a closed system, said method comprising the steps of providing a closed system having a generating zone, a reacting zone, and a pressure determination zone, introducing a first fluid to said generating zone, filling said system with said gas, introducing said liquid substance to said reacting zone, permitting said gas to be absorbed by said liquid substance thereby reducing the gas pressure in said generating and reacting zones, separating said generating and reacting zones from said pressure determination zone by a fluid seal having an original level which moves to a lower level in said pressure determination zone as said gas is absorbed by said liquid substance, and introducing a displacing liquid, immiscible with and lighter than said first fluid, into said generating zone from a point below the surface of said first fluid so as to restore the original gas pressure in said generating and reacting zones when said fluid seal is returned to its original level.

8. The method of claim 7 wherein a catalyst for facilitating the absorption is added to said closed system prior to filling said system with said gas.

9. The method of claim 7 wherein said gas is hydrogen and said liquid substance is a chemically unsaturated substance, and a hydrogenation catalyst is added to said closed system prior to filling said system with hydrogen.

10. The method of claim 7 wherein said first fluid and said fluid seal are mercury and said displacing liquid is water.

(References on following page)

References Cited

UNITED STATES PATENTS

| | | | |
|---|---|---|---|
| 1,124,432 | 1/1915 | Heath | 23—256 |
| 1,366,382 | 1/1921 | Heath | 23—256 |

OTHER REFERENCES

Altieri, page 160–170, "Gas Analysis," American Gas Assn., N.Y., 1945.

Cenco, page 264–266, "Catalogue J–300," Central Scientific, Chicago, 1961.

Siggia et al.: 35, 362–364, J. Anal. Chem., March 1963.

Clauson-Kass et al.: "Microhydrogenation Apparatus," Acta Chem., Scand., vol. 1, pages 884–887 (1947).

JOSEPH SCOVRONEK, *Acting Primary Examiner.*

MORRIS O. WOLK, *Examiner.*

L. MEI., *Assistant Examiner.*